United States Patent [19]

Bopp et al.

[11] 4,448,937

[45] May 15, 1984

[54] BLENDS OF POLYETHERIMIDES AND BLOCK POLY(ESTERAMIDES)

[75] Inventors: Richard C. Bopp, West Coxsackie; Joseph C. Golba, Jr., Ballston Spa, both of N.Y.; Scott A. White, Louisville, Ky.

[73] Assignee: General Electric Company, Schenectady, N.Y.

[21] Appl. No.: 487,495

[22] Filed: Apr. 21, 1983

[51] Int. Cl.$^3$ .................. C08L 77/12; C08L 79/08
[52] U.S. Cl. ............................ 525/432; 525/425; 525/928
[58] Field of Search .................. 525/432, 928, 425

[56] References Cited

U.S. PATENT DOCUMENTS 4,328,331  5/1982  Chen et al. .................. 525/425
4,340,697  7/1982  Aya et al. .................... 525/928

OTHER PUBLICATIONS

Nelb et al., "Poly(Esteramide): Thermoplastic Elastomers for High Temperature Applications", *Proceedings of the Society of Plastics Engineers*, 39th Annual Technical Conference, pp. 421–423 (1981).

*Primary Examiner*—John C. Bleutge
*Assistant Examiner*—A. L. Carrillo
*Attorney, Agent, or Firm*—William H. Pittman; James C. Davis, Jr.; James Magee, Jr.

[57] ABSTRACT

Blends of polyetherimides and block poly(esteramides) may contain about 99–1% by weight of the former and about 1–99% of the latter. Particularly useful are polyetherimides containing about 1–30% of the block poly(esteramide), which have improved impact strength and resistance to brittleness. The blends may also contain at least one poly(alkylene dicarboxylate) as a compatibility improver.

16 Claims, No Drawings

BLENDS OF POLYETHERIMIDES AND BLOCK POLY(ESTERAMIDES)

This invention relates to new resinous compositions of matter characterized by improved impact resistance and other advantageous properties. In its broadest sense, the invention includes resinous compositions comprising (A) about 99–1% by weight of at least one polyetherimide and (B) about 1–99% of at least one block poly(esteramide) having the formula

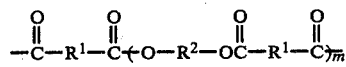

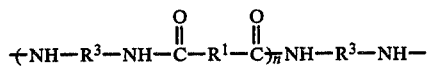

wherein each $R^1$ is independently a divalent aliphatic hydrocarbon-based radical, each $R^2$ is independently a divalent aliphatic hydrocarbon-based radical, each $R^3$ is independently a divalent aromatic hydrocarbon-based radical, and m and n are each at least about 100.

Polyetherimide resins are well known in the art and are of considerable commercial value for use in molding compositions because of their good high-temperature characteristics and ductility. It has been found, however, that polyetherimides may become brittle under certain conditions, especially when subjected to a triaxial or highly strained stress state. Such a stress state is exemplified by the conditions of the Izod impact test as described in ASTM Procedure D256, Method A. In this test, the impact required to break a test specimen by striking it on a notched surface thereof is measured.

It is, of course, desirable to formulate polyetherimide resins with as many advantageous properties as possible, including resistance to brittleness in the triaxial stress state. Accordingly, a principal object of the present invention is to provide resinous compositions with improved impact strength, resistance to brittleness and other advantageous properties.

A further object is to provide improved polyetherimide resin compositions containing toughening ingredients.

Other objects will in part be obvious and will in part appear hereinafter.

As will be apparent from the foregoing brief description of the resinous compositions of this invention, they comprise two essential components. Component A, the principal component, is at least one polyetherimide. Polyetherimides are a class of polymeric materials well known in the art; illustrative disclosures of such polyetherimides and of methods for their preparation appear in a large number of U.S. patents, including the following which are specifically incorporated by reference herein.

| | | |
|---|---|---|
| 3,803,085 | 3,917,643 | 4,092,297 |
| 3,833,544 | 3,933,749 | 4,197,396 |
| 3,833,546 | 3,983,093 | 4,297,385 |
| 3,838,097 | 3,989,670 | 4,302,575 |
| 3,847,867 | 3,991,004 | 4,324,882 |
| 3,850,885 | 4,011,198 | 4,324,883 |
| 3,875,116 | 4,024,101 | 4,330,666 |
| 3,905,942 | | |

Typical polyetherimides useful as component A consist essentially of chemically combined units of the formula

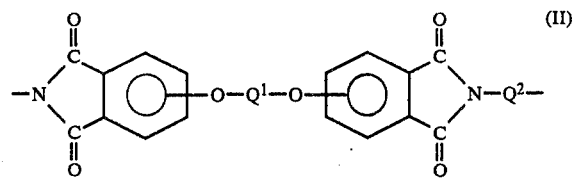

wherein $Q^1$ is a divalent aromatic hydrocarbon-based radical and $Q^2$ is a divalent hydrocarbon-based radical. The term "divalent hydrocarbon-based radical", as used in the definition of the polyetherimides, denotes a divalent radical free from ethylenic and acetylenic unsaturation, having a carbon atom directly attached to the remainder of the molecule and having predominantly hydrocarbon character within the context of this invention. Such radicals include the following:

(1) Hydrocarbon radicals; that is, aliphatic, alicyclic, aromatic, aliphatic- and alicyclic-substituted aromatic, aromatic-substituted aliphatic and alicyclic radicals, and the like. Such radicals are known to those skilled in the art; examples are ethylene, propylene, trimethylene octamethylene, cyclopentylene, cyclohexylene, phenylene, tolylene, xylylene, 1,4-naphthylene, 1-5-naphthylene, p,p'-biphenylene and 2,2-(p,p'-diphenylene)propane (all isomers being included).

(2) Substituted hydrocarbon radicals; that is, radicals containing non-hydrocarbon substituents which, in the context of this invention, do not alter the predominantly hydrocarbon character of the radical. Those skilled in the art will be aware of suitable substituents; examples are halo, alkoxy (especially lower alkoxy), carbalkoxy, nitro, cyano and alkyl sulfone.

(3) Hetero radicals; that is, radicals which, while predominantly hydrocarbon in character within the context of this invention, contain atoms other than carbon present in a chain or ring otherwise composed of carbon atoms. Suitable hetero atoms will be apparent to those skilled in the art and include, for example, nitrogen, oxygen, sulfur and silicon.

For the most part, not more than three substituents or hetero atoms will be present for each 10 carbon atoms in the hydrocarbon-based radical. An exception comprises molecules in which silicon is a hetero atom, which may, for example, contain three hetero atoms for as few as 4 carbon atoms.

Terms such as "divalent aromatic hydrocarbon-based radical" and the like have analogous meanings with respect to aromatic radicals and the like.

The radical $Q^1$ in formula II is a divalent aromatic hydrocarbon-based radical. It is most often a divalent radical derived from benzene or a substituted benzene, biphenyl or a substituted biphenyl, or a diphenylalkane which may contain substituents on one or both aromatic radicals. The following radicals are preferred as $Q^1$:

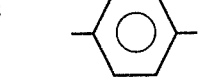

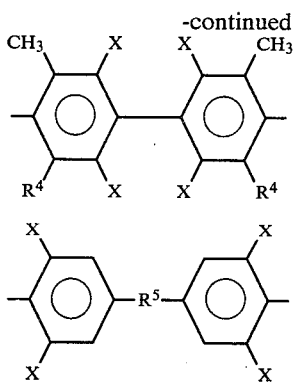
(IV)

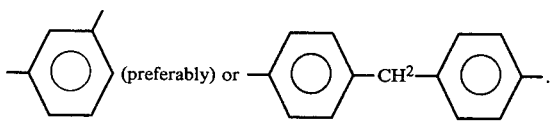
(V)

wherein each R⁴ is independently hydrogen or methyl, R⁵ is a straight-chain or branched alkylene radical containing 1–5 carbon atoms and is most often the isopropylidene radical, and each X is independently hydrogen or halogen (usually chlorine or bromine). Mixtures of the foregoing formulas are also contemplated. Especially preferred is the radical derived from bisphenol A [i.e. 2,2'-bis(4-hydroxyphenyl)propane] by the removal of both hydroxy groups therefrom, and having formula V wherein R⁵ is isopropylidene and each X is hydrogen.

Q² in formula II is most often an aromatic hydrocarbon radical containing about 6–20 carbon atoms or a halogenated derivative thereof, an alkylene or cycloalkylene radical containing about 2–20 carbon atoms, or a bis-alkylenepoly(dialkylsiloxane) radical. The aromatic hydrocarbon radicals are preferred.

The Q¹⁻² radicals of formula II may be conveniently defined in terms of typical polyetherimide precursors, herein identified respectively as bis-anhydrides of the formula

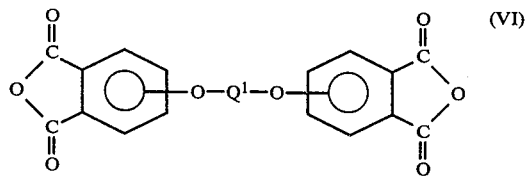
(VI)

and diamines of the formula (VII) H₂N—Q²—NH₂.

In formula VI, the O—Q¹—O— moiety may be attached to the phthalic anhydride moieties in the 3-positions or, preferably, the 4-positions, or mixtures thereof. Thus, the preferred bis-anhydride of formula VI for use according to this invention is 2,2-bis[4-(3,4-dicarboxyphenoxy)phenyl]propane dianhydride (hereinafter "bisphenol A dianhydride").

Examples of suitable diamines of formula VII are ethylenediamine, propylenediamine, trimethylenediamine, diethylenetriamine, triethylenetetramine, heptamethylenediamine, octamethylenediamine, 2,11-dodecanediamine, 1,12-octadecanediamine, 3-methylheptamethylenediamine, 4,4-dimethylheptamethylenediamine, 5-methylnonamethylenediamine, 2,5-dimethylhexamethylenediamine, 2,2-dimethylpropylenediamine, N-methyl-bis(3-aminopropyl)amine, 3-methoxyhexamethylenediamine, 1,2-bis(3-aminopropoxy)ethane, bis(3-aminopropyl) sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, benzidine, 3,3'-dimethyl-benzidine, 3,3'-dimethoxybenzidine, 1,5-diaminonaphthalene, 4,4'-diaminodiphenylmethane, 4,4'-diaminodiphenylpropane, 2,4-bis-(β-amino-t-butyl)toluene, bis(p-β-methyl-o-aminopentyl)-benzene, 1,3-diamino-4-isopropylbenzene, 4,4-diaminodiphenyl sulfone, 4,4'-diaminodiphenyl ether and bis(3-aminopropyl) tetramethyldisiloxane. Mixtures of these diamines may also be used. Particularly preferred are the aromatic diamines, especially m-phenylenediamine and 4,4'-diaminodiphenylmethane; the Q² radical is then either

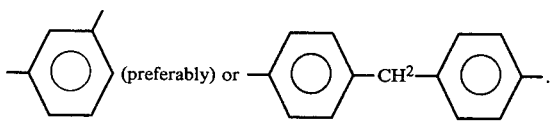

The polyetherimides comprising component A generally have a weight average molecular weight up to about 3,000,000, preferably about 10,000–100,000 and most desirably about 50,000–80,000. Polyetherimides of this type are commercially available from General Electric Company under the trade name ULTEM.

Component B in the compositions of this invention is at least one block poly(esteramide) having formula I. In that formula, the R¹ values are divalent aliphatic hydrocarbon-based radicals which usually contain about 2–10 and preferably about 5–10 carbon atoms, corresponding to the alkylene radicals in such dicarboxylic acids as succinic, glutaric, adipic, pimelic, sebacic, azelaic and suberic acids, most preferably adipic and azelaic acids (i.e., R¹ is tetramethylene or heptamethylene).

The R² values are similar to R¹ and preferably contain about 3–8 carbon atoms, corresponding to those in such diols as ethylene glycol, propylene glycol, trimethylene glycol or, preferably, tetramethylene or heptamethylene glycol. Most preferably, the total number of carbon atoms in R¹ and R² is 10 or 11.

The R³ value is a divalent aromatic hydrocarbon-based radical similar to those disclosed hereinabove with reference to Q¹ and corresponding to various aromatic diamines. Most often, R³ is at least one of the toluylene (any isomer) and 4,4'-methylenebis-phenyl (preferably) radicals.

As is apparent from the fact that R¹, R² and R³ are hydrocarbon-based radicals, they may contain substituents although hydrocarbon radicals are preferred. Among the suitable substituents for R¹, R² and R³ respectively are carboxy, hydroxy and amino, which may themselves be condensed with appropriate groups to form crosslinked or graft polymers with pendant polyester, polyamide or poly(esteramide) blocks. Each R¹, R² and R³ value is defined independently, since mixtures of acids, diols and diamines or mixtures with similar trifunctional compounds may be used or a different acid may be used in each stage of the preparation of component B. Most often, however, all of the R¹, R² and R³ values, respectively, are the same.

The block poly(esteramides) useful as component B may be prepared in two stages. In the first stage a commercially available polyester diol of the formula

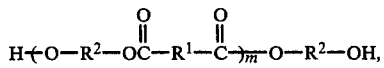

such as hexamethylene adipate or tetramethylene azelate, is reacted with at least one dicarboxylic acid of the formula $R^1(COOH)_2$ under conditions and in proportions to produce a carboxy-terminated prepolymer having the formula

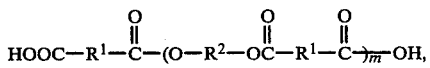

wherein $R^{1-2}$ and m are as previously defined. In the second stage, said prepolymer is reacted with a mixture of additional dicarboxylic acid and a diisocyanate of the formula $OCN-R^3-NCO$ to produce the block poly(esteramide). Block polymers of this type are commercially available, for example, from Upjohn Company under the trade name ESTAMIDE. They are disclosed in *Proceedings of the Society of Plastics Engineers*, 39th Annual Technical Conference (New York, May 4–7, 1981), pp. 421–423 (hereinafter "Nelb et al."), which is incorporated by reference herein.

In the resinous compositions of this invention, components A and B are respectively present in the amounts of about 99–1% and about 1–99% by weight, respectively. When a predominantly polyetherimide resin having improved impact strength is desired, component B may be present in amount of about 1–30% and preferably about 5–20% by weight.

In another embodiment of the invention, the resinous composition additionally comprises about 5–25% and preferably about 3–15% by weight of (C) at least one poly(alkylene dicarboxylate) which serves as a compatibility improver. The dicarboxylate units in component C are derived from an aromatic dicarboxylic acid such as isophthalic acid, terephthalic acid, 1,4-naphthalenedicarboxylic acid, 1,5-naphthalenedicarboxylic acid, 4,4'-biphenyldicarboxylic acid or 4,4'-diphenylmethanedicarboxylic acid. The benzenedicarboxylic acids, e.g., isophthalic and terephthalic acids, especially the latter, are preferred. The alkylene groups generally contain about 2–10 and preferably about 2–6 carbon atoms; they are illustrated by ethylene, trimethylene, tetramethylene and hexamethylene, with tetramethylene being preferred. Poly(alkylene terephthalates) are commercially available from General Electric Company under the trade name VALOX. They and the methods for their preparation are disclosed, for example, in the following U.S. patents which are incorporated by reference herein: Nos.

2,456,319
3,047,539
4,161,469
4,161,498.

The preferred poly(alkylene terephthalates) have a number average molecular weight of about 20,000–50,000.

The present invention is illustrated by the compositions listed in the following table. In these compositions, component A is an ULTEM resin of General Electric Company prepared from m-phenylenediamine and bisphenol A dianhydride, having an intrinsic viscosity in chloroform at 25° C. of 0.47 dl./g., a weight average molecular weight of 75,100 and a number average molecular weight of 20,600 as determined by gel permeation chromatography referred to polystyrene. Component B is ESTAMIDE 90A as described in Nelb et al.; it has a weight average molecular weight of about 110,000 as measured by laser light scattering (low angle) in dimethylformamide. Component C is a poly(tetramethylene terephthalate) having a number average molecular weight of about 34,000 and an intrinsic viscosity in a 3:2 mixture of phenol and tetrachloroethane at 30° C. of 1.05 dl./g. The Izod impact strengths in the table were determined by ASTM procedure D256, Method A.

| Example | Component proportions, % by weight | | | Impact strength, ft.-lbs./in. |
|---|---|---|---|---|
| | A | B | C | |
| Control 1 | 100 | — | — | 0.60 |
| 1 | 95 | 5 | — | 1.44 |
| 2 | 90 | 10 | — | 1.99 |
| 3 | 85 | 15 | — | 1.86 |
| 4 | 75 | 25 | — | 0.94 |
| Control 2 | 85 | — | 15 | 0.55 |
| 5 | 81.0 | 4.7 | 14.3 | 0.94 |
| 6 | 77.3 | 9.1 | 13.6 | 1.02 |
| 7 | 74.0 | 13.0 | 13.0 | 1.65 |
| 8 | 68.0 | 20.0 | 12.0 | 1.29 |
| 9 | 78.3 | 13.0 | 8.7 | 2.29 |
| 10 | 82.6 | 13.0 | 4.4 | 2.09 |

The results in the table show the improved impact strength provided by the compositions of this invention in which component B is present, as compared with Controls 1 and 2 in which it is absent, especially in the further presence of component C.

What is claimed is:

1. A resinous composition comprising
   (A) about 99–1% by weight of at least one polyetherimide consisting essentially of chemically combined units of the formula

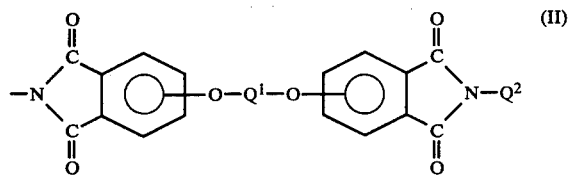

wherein $Q^1$ is a divalent aromatic hydrocarbon-based radical and $Q^2$ is a divalent hydrocarbon-based radical, and
   (B) about 1–99% of at least one block poly(esteramide) having the formula,

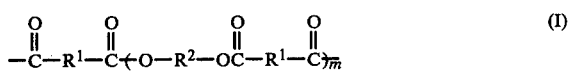

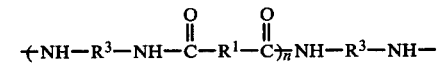

wherein each $R^1$ is independently a divalent aliphatic hydrocarbon-based radical, each $R^2$ is independently a divalent aliphatic hydrocarbon-based radical, each $R^3$ is independently a divalent aromatic hydrocarbon-based radical, and m and n are each at least about 100.

2. A composition according to claim 1 wherein component B is present in the amount of about 1–30% by weight.

3. A composition according to claim 2 wherein the total number of carbon atoms in $R^1+R^2$ is 10 or 11.

4. A composition according to claim 3 wherein the polyetherimide has a weight average molecular weight of about 10,000–100,000.

5. A composition according to claim 4 wherein $Q^1$ has one of the following formulas:

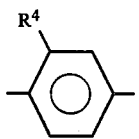
(III)

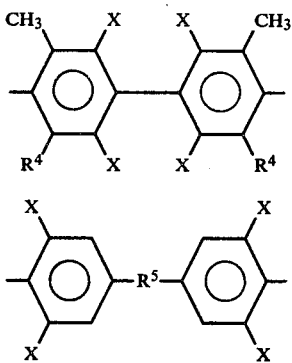
(IV)

(V)

wherein each $R^4$ is independently hydrogen or methyl, $R^5$ is a straight-chain or branched alkylene radical containing 1–5 carbon atoms, and each X is independently hydrogen or halogen.

6. A composition according to claim 5 wherein $Q^1$ has formula V, each X is hydrogen and $R^5$ is the isopropylidene radical.

7. A composition according to claim 6 wherein $Q^2$ has one of the following formulas:

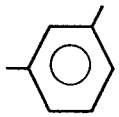

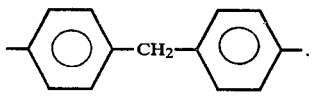

8. A composition according to claim 7 wherein $R^3$ is at least one of the toluylene and 4,4'-methylene-bis-phenyl radicals.

9. A composition according to claim 8 wherein each $R^1$ and $R^2$ is tetramethylene or heptamethylene.

10. A composition according to claim 9 wherein $Q^2$ is m-phenylene and $R^3$ is 4,4'-methylene-bis-phenyl.

11. A composition according to claim 10 wherein component B is present in the amount of about 5–20% by weight.

12. A composition according to claim 1, 3, 5, 9, 10 or 11 which additionally comprises about 5–25% by weight of (C) at least one poly(alkylene dicarboxylate) wherein the dicarboxylate units are derived from an aromatic dicarboxylic acid.

13. A composition according to claim 12 wherein the alkylene groups in component C contain about 2–10 carbon atoms.

14. A composition according to claim 13 wherein the dicarboxylate units in component C are derived from terephthalic acid.

15. A composition according to claim 14 wherein component C is present in the amount of about 10–20% by weight.

16. A composition according to claim 15 wherein component C is poly(tetramethylene terephthalate) having a number average molecular weight of about 20,000–50,000.

* * * * *